April 23, 1957  H. PRIESS  2,789,355
PARALLEL RULER FITTED WITH ROLLERS
Filed May 26, 1952  2 Sheets-Sheet 1

INVENTOR
HANS PRIESS

FIG. 6a  FIG. 6

United States Patent Office 2,789,355
Patented Apr. 23, 1957

2,789,355

PARALLEL RULER FITTED WITH ROLLERS

Hans Priess, Nienburg (Weser), Germany

Application May 26, 1952, Serial No. 290,026

Claims priority, application Germany July 28, 1951

2 Claims. (Cl. 33—109)

This invention relates to parallel rulers fitted with scale means for use when lines are to be drawn at a given distance apart, and with indicating means for facilitating the reading of said scale means.

One object of the invention is to provide a parallel ruler of the above kind which is of simple, cheap and compact construction.

Another object of the invention is to provide improved indicating means which can be easily and accurately read.

One embodiment of a parallel ruler fitted with scale and indicating means made according to the invention is illustrated in the accompanying drawing, in which:

Figures 6 and 6a illustrate respectively the correct and incorrect use of the sighting device shown in Figure 5.

Figure 1:
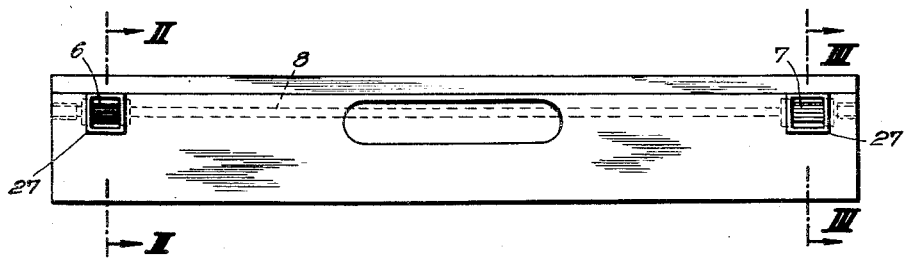
Figure 1 is a plan view of the ruler.
Figure 2:
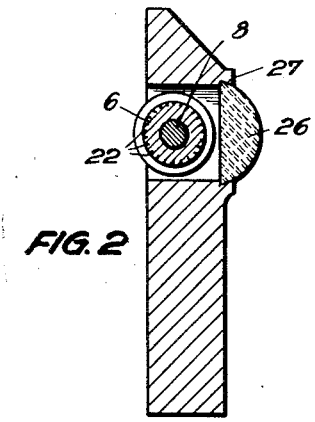
Figure 2 is a cross section on a bigger scale taken on the line II of Figure 1.
Figure 3:
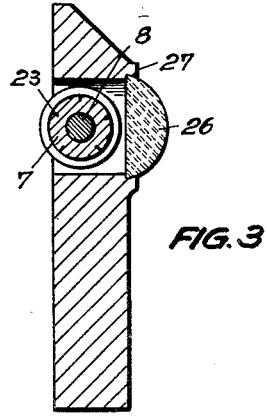
Figure 3 is a cross section also on a bigger scale taken on line III—III of Figure 1.
Figure 4:
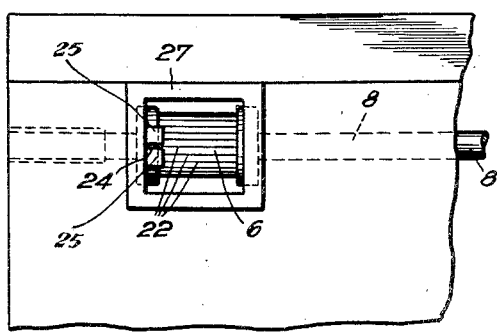
Figure 4 is a plan view also on a bigger scale of a part of the ruler in which one roller is fitted.

The top part of the ruler shown in the drawing rests on two rollers 6, 7, which are rigidly connected together by a spindle 8. The rollers 6, 7 are of approximately I-shape, the recessed part of the perimeter of each roller being provided with a measurement scale. The graduation of the scale 22 on the roller 6 corresponds, for example, to a rolling movement of 1 mm. or 1/16", and the graduation of the scale 23 on the roller 7 corresponds to a rolling movement which is equal to the line spacing of a typewritten letter.

In order to facilitate the reading of the scale a sighting mark 24 is arranged on a fixed part of the ruler, on a surface 25, from the bottom of which it is noticeably raised. If the sighting mark 24 is formed by a black line the surface 25 can be made white. Instead of a black and white arrangement other colours may be used.

In the window delimited by the frame 27 above each of the rollers 6, 7 is fixed a magnifying lens 26 which magnifies the scale on the rollers.

Figure 5:
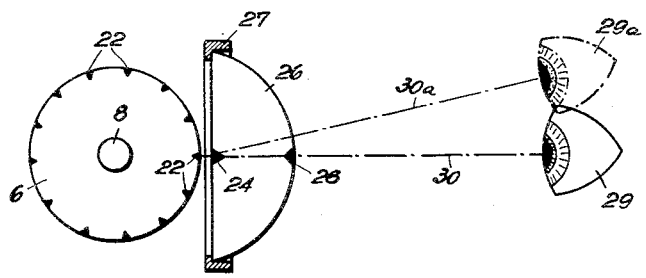
Figure 5 illustrates the use of a modified form of sighting device which can be incorporated in the ruler.
Figure 5:
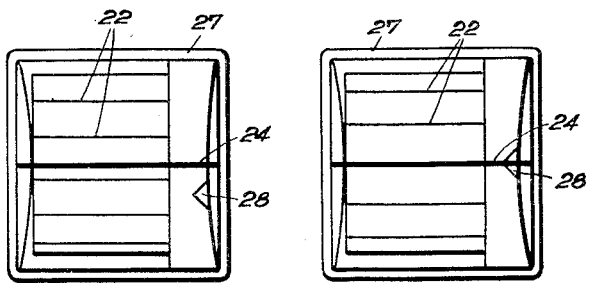

The modified form of sighting device shown in Figure 5 comprises a sighting mark 24 disposed on the lower side of the magnifying lens 26 and a second sighting mark 28 disposed on the top side of the lens 26. In use the eye 29 must be brought in such a position that the connecting line 30 from a viewer's eye 29 passes straight through the sighting marks 28 and 24. In this case the plan view on the lens is as shown in Figure 6. Should, however, the viewer's eye be at too high a level, for example, in the position 29a shown in Figure 5, the straight line 30a from the eye 29a to the sighting mark 24 does not pass through the sighting mark 28. The plan view on the lens is then in accordance with Figure 6a, in which the sighting mark 28 is disposed below the sighting mark 24.

The two sighting marks 28 and 24 thus make it possible to adjust the movement of the ruler accurately in accordance with the graduation marks 22 of the scale on the roller 6.

What I claim and desire to secure by Letters Patent is:

1. A parallel ruler comprising a flat solid body portion formed with two apertures, one adjacent each end of said body portion, two rollers respectively fitted in said apertures so that the peripheries of said rollers project only below the bottom surface of said body portion to make rolling contact with a supporting surface, a spindle extending through said body portion on which spindle said rollers are mounted, two measurement scales provided respectively on the perimeters of said two rollers, one of said scales being graduated in a standard unit such as inches or millimeters, and the other of said scales being graduated in units corresponding to the standard line spacing of a typewriter, to magnifying lenses respectively fixed in said apertures on the top surface of said ruler so as to be disposed respectively over said scales on said rollers, and two clearly perceptible sighting devices carried on said ruler and associated respectively with said lenses and said scales on said rollers.

2. A parallel ruler according to claim 1 in which each of said sighting devices comprises marks carried on the top and bottom surfaces of each of said lenses.

References Cited in the file of this patent

UNITED STATES PATENTS

| | | |
|---|---|---|
| 147,943 | Joy | Feb. 24, 1874 |
| 552,988 | Davies | Jan. 14, 1896 |
| 704,313 | Gerardin | July 8, 1902 |
| 1,511,378 | Strom | Oct. 14, 1924 |
| 1,825,902 | Gianolio | Oct. 6, 1931 |
| 1,834,745 | Shifner | Dec. 1, 1931 |
| 2,403,382 | Lerner | July 2, 1946 |

FOREIGN PATENTS

| | | |
|---|---|---|
| 352,755 | Great Britain | July 16, 1931 |